US010513789B2

(12) United States Patent
Baxter (10) Patent No.: US 10,513,789 B2
(45) Date of Patent: *Dec. 24, 2019

(54) INTEGRATED GAS TREATMENT (71) Applicant: Bechtel Mining & Metals, Inc., Houston, TX (US)

(72) Inventor: Robert Frederick Baxter, Kingston (CA)

(73) Assignee: Bechtel Mining & Metals, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,313

(22) Filed: Jan. 30, 2018

(65) Prior Publication Data

US 2018/0155843 A1    Jun. 7, 2018

Related U.S. Application Data (63) Continuation of application No. 15/317,186, filed as application No. PCT/US2014/041485 on Jun. 9, 2014, now Pat. No. 9,920,442.

(51) Int. Cl.
*C25C 3/22* (2006.01)
*B01D 53/12* (2006.01)

(52) U.S. Cl.
CPC ............... *C25C 3/22* (2013.01); *B01D 53/12* (2013.01); *B01D 2253/104* (2013.01); *B01D 2257/2047* (2013.01)

(58) Field of Classification Search
CPC .... C25C 3/22; B01D 53/12; B01D 2253/104; B01D 2257/2047
See application file for complete search history.

(56) References Cited

U.S. PATENT DOCUMENTS

| 3,503,184 A | 3/1970 | Knapp et al. |
| 3,664,935 A | 5/1972 | Johnson |
| 3,780,497 A | 12/1973 | Muhlrad |
| 9,920,442 B2* | 3/2018 | Baxter .................. B01D 53/10 |
| 2008/0050298 A1 | 2/2008 | Meyoen et al. |

FOREIGN PATENT DOCUMENTS

WO    20080119100    10/2007

OTHER PUBLICATIONS

Randall Menard, Office Action, Canadian Patent Application No. 2,951,225, dated Dec. 21, 2017, 3 pages, Canadian Patent Office, Canada.
Stephanie White, Response to Exam Report, Canadian Patent Application No. 2,951,225, dated Jun. 20, 2018, 10 pages, Kirby IP, Canada.
Caixia Zeng, First Office Action, Chinese Patent Application No. 201480079735.6, dated Mar. 30, 2018, 9 pages, State Intellectual Property Office of People's Republic of China, China.
(Continued)

*Primary Examiner* — Arun S Phasge
(74) *Attorney, Agent, or Firm* — Crain, Caton and James (57) ABSTRACT Systems and methods for reducing the capital and operating costs of a smelting process system and improving the environmental impact of the smelting process using an IGT system to remove and filter undesirable and environmentally hazardous gases and particulates from each electrolytic cell in the smelting process system.

19 Claims, 4 Drawing Sheets

(56) References Cited

OTHER PUBLICATIONS

Minghai Liu, Response to First Office Action, Chinese Patent Application No. 201480079735.6, dated Jul. 4, 2018, 4 pages, BOIP Patents, China.

Eng. Ebrahim Al-Qurashi, Examination Report, GCC Patent Application No. 30122, dated Mar. 25, 2018, 4 pages, Patent Office of the Cooperation Council for The Arab States of The Gulf, Saudi Arabia.

Al Hadaf Marks Services, LLC, Response to Examination Report, GCC Patent Application No. 30122, dated May 3, 2018, 9 pages, Al Hadaf Marks Services, LLC, Saudi Arabia.

Eng, Ebrahim Al-Qurashi, Examination Report, GCC Patent Application No. 30122, dated May 29, 2018, 3 pages, Patent Office of the Cooperation Council for The Arab States of The Gulf, Saudi Arabia.

V. I. Krasina, First Office Action, Russian Patent Application No. 2016148219, dated Apr. 28, 2018, 7 pages, Federal Institute of Industrial Property, Moscow.

ARS-Patent, Response to Office Action, Russian Patent Application No. 2016148219, dated Jun. 5, 2018, 2 pages, ARS Patent, Russia.

Richard Butterfield, First Examination Report, New Zealand Patent Application No. 739177, dated Apr. 26, 2018, 3 pages, New Zealand Intellectual Property Office, New Zealand.

Anabella Newton, Response to First Examination Report, New Zealand Patent Application No. 739177, dated Jun. 7, 2018, 2 pages, Phillips Ormonde Fitzpatrick IP, Australia.

Richard Butterfield, Further Examination Report, New Zealand Patent Application No. 739177, dated Jul. 5, 2018, 4 pages, New Zealand Intellectual Property Office, New Zealand.

David J Tadgell, Response to Examination Report, New Zealand Patent Application No. 739177, dated Jul. 24, 2018, 3 pages, Phillips Ormonde Fitzpatrick IP, Australia.

Richard Butterfield, Further Examination Report, New Zealand Patent Application No. 739177, dated Aug. 7, 2018, 3 pages, New Zealand Intellectual Property Office, New Zealand.

David J Tadgell, Response to Examination Report, New Zealand Patent Application No. 739177, dated Aug. 23, 2018, 27 pages, Phillips Ormonde Fitzpatrick IP, Australia.

Christopher Benson, Response to Office Action, European Patent Application No. 14894359.0, dated Jul. 12, 2018, 3 pages, HGF, United Kingdom.

Eng. Ebrahim Al-Qurashi, Examination Report, GCC Patent Application No. 2015-35912, dated Jan. 14, 2019, 5 pages, Patent Office of the Cooperation Council for The Arab States of the Gulf, Saudi Arabia.

Heramb Bal, Examination Report No. 1, Australian Patent Application No. 2018200739, dated Feb. 15, 2019, 6 pages, Australian Government, Australia.

Edwin Patterson, Phd., Response to Examination 1, Australian Patent Application 2018200739, dated Feb. 25, 2019, 9 pages, Phillips Ormonde Fitzpatrick, Australia.

Richard Butterfield, First Examination Report, New Zealand Patent Application No. 745606, dated Feb. 15, 2019, 2 pages, New Zealand Intellectual Property Office, New Zealand.

David J Tadgell, Response to Examination Report, New Zealand Patent Application No. 745606, dated Mar. 12, 2019, 2 pages, Phillips Ormonde Fitzpatrick, New Zealand.

Richard Butterfield, Further Examination Report, New Zealand Patent Application No. 745606, dated Apr. 5, 2019, 3 pages, New Zealand Intellectual Property Office, New Zealand.

David J Tadgell, Response to Examination Report, New Zealand Patent Application No. 745606, dated May 2, 2019, 43 pages, Phillips Ormonde Fitzpatrick, New Zealand.

Al Hadaf Mark Services LLC, Response to Office Action, GCC Patent Application No. 35912, dated Apr. 24, 2019, 4 pages, Al Hadaf Marks Services, LLC, Saudi Arabia.

Mohd Zaki Bin Zakaria, Substantive Examination Adverse Report, Malaysian Patent Application No. PI 2016002150, 4 pages, Intellectual Property Corporation of Malaysia, Malaysia.

V.I. Krasina, Inquiry Under the Substantive Examination, Russian Patent Application No. 2018133522/02, dated Jun. 5, 2019, 6 pages, The Federal Institute of Industrial Property, Moscow.

M.B. Xmapa, Response to Office Action, Russian Patent Application No. 2018133522/02, dated Aug. 9, 2019, 3 pages, ARS Patent, Russia.

Natalia Cristina, Technical Examination Report, Brazilian Patent Application No. BR112016028690-1, dated Jul. 8, 2019, 3 pages, National Institute of Industrial Property, Brazil.

Eduardo Rosman, Response to Written Opinion, Patent Application No. BR112016028690-1, Sep. 23, 2019, 6 pages, Kasznar Leonardos Intellectual Property, Rio de Janeiro, Brazil.

* cited by examiner

INTEGRATED GAS TREATMENT

CROSS-REFERENCE TO RELATED APPLICATIONS

The present application is a continuation of U.S. patent application Ser. No. 15/317,186, filed Dec. 8, 2016, which is a 371 National Stage Application of PCT Patent Application No. PCT/US2014/41485, filed on Jun. 9, 2014, which are incorporated herein by reference.

FIELD OF THE DISCLOSURE

The present disclosure generally relates to systems and methods for integrated gas treatment (IGT). More particularly, the present disclosure relates to reducing the capital and operating costs of a smelting process system and improving the environmental impact of the smelting process using an IGT system to remove and filter undesirable and environmentally hazardous gases and particulates from each electrolytic cell in the smelting process system.

BACKGROUND OF THE DISCLOSURE

Aluminum metal is produced industrially by electrolysis of smelter grade (or other) alumina in a molten electrolyte, using the well-known Hall-Héroult process. This process may be referred to herein generally as a smelting process. The electrolyte is contained in a pot comprising a steel pot shell, which is coated on the inside with refractory and insulating materials, and a cathodic assembly located at the bottom of the electrolytic cell. Carbon anodes extend into the above referenced electrolyte composed of molten cryolyte and dissolved alumina. A direct current, which may reach values of more than 500 kA, flow through the anodes, electrolyte and cathode generating reactions that reduce the alumina to aluminum metal, and that heat the electrolyte by the Joule effect to a temperature of approximately 960° C.

Emissions from the electrolytic cell are comprised of a number of gaseous and particulate constituents, also referred to as process gases, such as hydrogen fluoride (Fg) and particulate fluoride (Fp). The mechanics involved with the generation of Fg and Fp by the electrolytic cell include:

i. electrochemical hydrolysis of hydrogen (H) sources that react with the molten electrolyte (at ~960° C.) forming gaseous hydrogen fluoride (e.g. structural hydroxyls (OH) in the alumina as measured by the Loss on Ignition (LOI 300° C. to 1000° C.)) hydrogen in the carbon anodes;

ii. thermal hydrolysis of hydrogen (H) sources entering the electrolytic cell that react with electrolyte vapor (~400° C.) escaping through the crust forming gaseous hydrogen fluoride (e.g. loosely bound moisture on the surface alumina, moisture from ambient air drawn into the electrolytic cell, and incomplete calcination of gibbsite in the alumina as measured by the Moisture on Ignition (MOI 20° C. up to 300° C.));

iii. electrolyte vapor that condenses forming fine fluoride particulates; and iv. particulate materials containing fluoride that are entrained in electrolytic cell process gases.

Recovery of Fg and Fp are of primary importance to the environment and metal reduction cost. Total fluoride (Fg and Fp) emissions to the environment are from two principle sources; that being, fugitive emissions that escape the electrolytic cell hooding and gas collection systems, which are discharged by the pot-room roof ventilator in a thermal plume to the environment, and the residual fluoride emissions that are not adsorbed by the alumina and filtered in the injection type dry scrubbing system, which are discharged to the environment by an exhaust stack. The former being the dominate emission source typically in the order of 4 times that discharged by the dry scrubber stack measured in terms of total mass of fluoride (Ft=Fg+Fp) released per tonne aluminum produced (kg Ft/t Al).

In terms of emission containment and capture, removable side covers facilitate periodic carbon anode assembly replacement and form the electrolytic cell's hooding system for minimizing the release of fugitive (untreated) emissions directly to the pot-room and environment. The emission collection efficiency of an electrolytic cell is predominately dependent upon the hooding efficiency, defined as the ratio of open area to closed area of a theoretically sealed electrolytic cell superstructure. The electrolytic cell ventilation rate and related under-pressure created inside the hooding system are important to ensure efficient emissions capture. The hooding efficiency and ventilation rate determine the leakage of fugitive emissions to the pot-room environment from the electrolytic process through gaps at the seams of the superstructure side cover panels, around anode the stem penetrations and end tapping doors when the electrolytic cell is closed or open for electrolytic cell maintenance and metal tapping. The ventilation rate from each electrolytic cell consists predominately of ambient air drawn into the electrolytic cell through gaps in the hooding system to ensure efficient capture of the process gases and pollutants. The ventilation capability (size) of the Gas Treatment Centre (GTC) is strongly influenced by this ingress of ambient air drawn into the electrolytic cell.

The net ventilation volume from the electrolytic cell is the sum of the process gases produced by the smelting process (typically less than 1% of net ventilation volume) and ambient air (typically 99% of net ventilation volume) drawn into the electrolytic cell through gaps in the hooding system. The process gas temperature varies indirectly with the process gas flow meaning that conventional smelting process systems with significantly reduced ventilation flow can theoretically generate process gas temperatures up to about 400 degrees celcius.

In addition to the fluoride emission rate from the pot-room roof being significantly greater in magnitude than that from the discharge stack of the injection type dry scrubbing system, fugitive (untreated) fluoride emissions released to the pot-room and environment are also considerably cooler than the residual fluoride emissions emitted from the injection type dry scrubbing system. The dispersion of emissions into the atmosphere for a given set of meteorological conditions is predominately driven by thermal buoyancy in the plume. Thus, the dispersion of cooler pot-room fugitive emissions tends to be considerably less effective than that for residual (relatively hotter) fluoride emissions from the dry scrubber stack.

Dry adsorption and chemisorption of gaseous fluorides onto the surface of fresh alumina followed by the recycle of the fluorinated alumina back to the electrolytic cell, as the feed material for an aluminum smelting process, is widely accepted as the best available technique for abating fluoride emissions from an electrolytic cell. The injection type dry scrubbing system uses a two-step integrated process; first adsorption followed by chemisorption of gaseous hydrogen fluoride onto the surface of smelter grade alumina, and then the disengagement and filtration of the alumina and particulate before releasing scrubbed gases (including residual emissions) to the environment.

Figure 1:
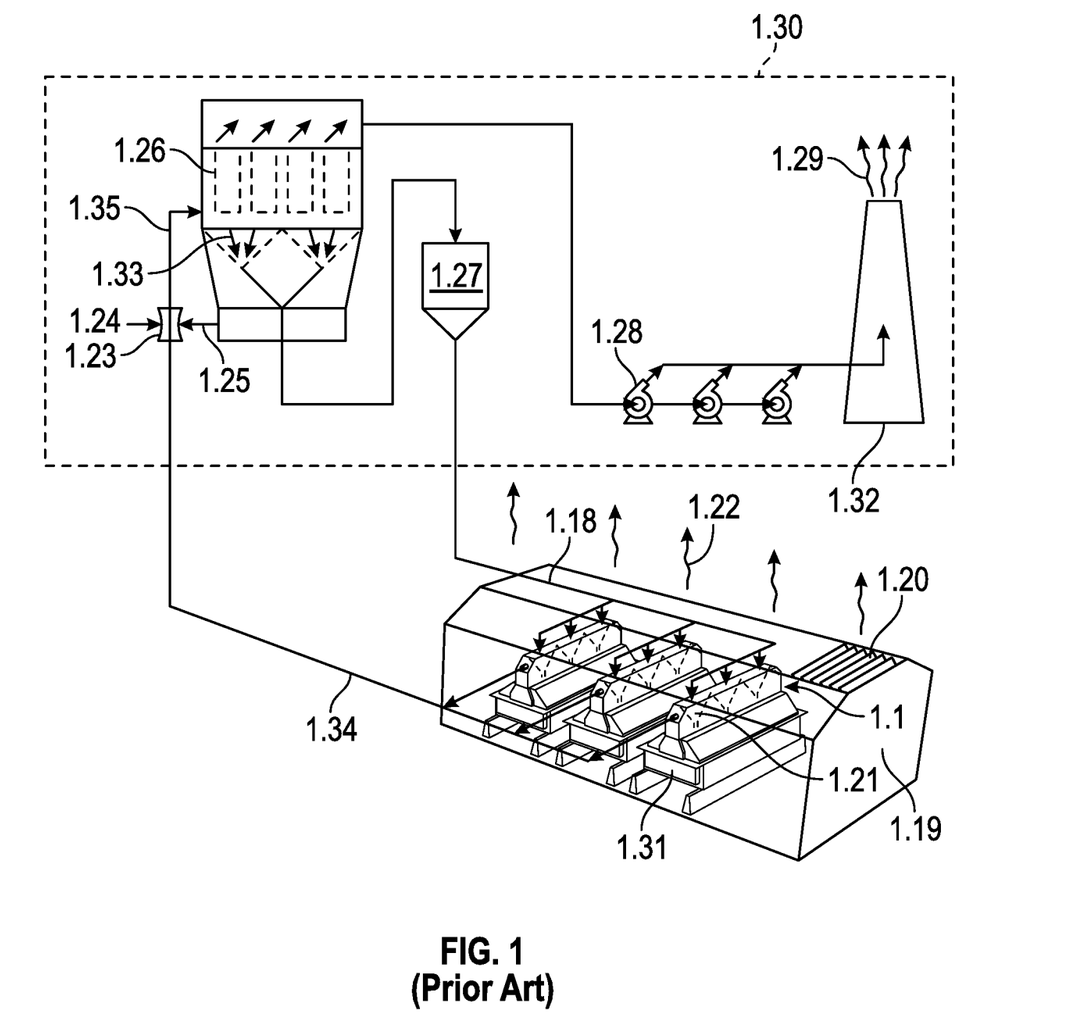
FIG. 1 is a schematic diagram illustrating a conventional smelting process system with a centralized GTC using injection type dry scrubbing.

The following description refers to FIG. 1, which is a schematic diagram illustrating a conventional smelting process system with a centralized Gas Treatment Center (GTC) 1.30 using injection type dry scrubbing outside of the electrolytic cell 1.31 and pot-room building 1.19. The process gases from the superstructure 1.1 of each electrolytic cell 1.31 are collected and conveyed to the centralized GTC 1.30 by a process gas duct 1.34. Fugitive (untreated) process gases not captured in each superstructure 1.1 by a conventional hooding system escape into the pot-room building 1.19 where they are then vented to the environment in an emission plume 1.22 through a roof gravity ventilator 1.20. The primary scrubbing of hydrogen fluoride occurs at the reactor 1.23 where fresh alumina 1.24 and recycled, fluorinated alumina 1.25 are injected into the process gases from the process gas duct 1.34 and exit the reactor as semi-scrubbed process gases through a semi-scrubbed process gas duct 1.35. The mixture of the semi-scrubbed process gases and fluorinated alumina are separated by secondary scrubbing using one or more filters 1.26. Secondary scrubbing occurs at the filter cake on the outer surface of the filters 1.26. The recycled, fluorinated alumina 1.25, injected at several times the fresh alumina 1.24 injection rate, improves the contact quality between the process gases and alumina resulting in better fluoride distribution in the fluorinated alumina 1.33 and a higher gaseous fluoride adsorption efficiency. The recycled, fluorinated alumina 1.25 also provides limited reserve scrubbing capability should the fresh alumina 1.24 be interrupted. It is, however, preferable to reduce, if not eliminate, the recycle rate (ratio of the recycled, fluorinated alumina 1.25 to fresh alumina 1.24) as high recycle rates are known to contribute to alumina attrition, scale formation, energy consumption, system abrasion and increased dust load on the filters 1.26. Contact time between the alumina and hydrogen fluoride in the process gases for primary scrubbing is measured in terms of seconds. The total average contact time between the alumina and hydrogen fluoride in the process gases for primary scrubbing and in the semi-scrubbed process gases for secondary scrubbing, when considering recycle rate and secondary reaction time at the surface of the filters 1.26, is measured in terms of one to two hours. The scrubbed process gases 1.29 and residual fluorides are vented to the environment by exhaust fans 1.28 and a stack 1.32. The fluorinated alumina 1.33 is typically stored in a fluorinated alumina bin 1.27 and then conveyed back to each electrolytic cell 1.31 by a fluorinated alumina conveyor 1.18 where it is stored in fluorinated alumina superstructure bins 1.21 as feedstock for each electrolytic cell 1.31.

For injection type dry scrubbing systems several factors are paramount for achieving efficient hydrogen fluoride adsorption on the surface of the alumina, and even distribution of fluoride (Fg+Fp) in the fluorinated alumina recycled back to the electrolytic cells, specifically:
  i. contact quality in terms of the intra-particle diffusion resistance between the hydrogen fluoride gases and alumina particles at the injection site;
  ii. process gas temperature during the adsorption process; and
  iii. an equal mass of fresh alumina reacting with an equal mass of hydrogen fluoride in the process gases between all operating filter compartments.

Depending on the electrolytic cell operating current, electrolytic cell heat balance and cover material (crust) maintenance practices, the temperature of the process gases exhausted from conventional electrolytic cells typically varies between 100° C. to 140° C. above ambient temperature. Due to heat loss from the process gas collection ductwork, the process gas temperature typically enters the GTCs (without additional cooling) between 85° C. to 125° C. above ambient temperature. A common practice employed today for injection type dry scrubbers is to limit the gas temperature entering the GTC to 115° C. to 125° C. to enhance the adsorption of hydrogen fluoride on to the surface of alumina. The corresponding temperature of the fluorinated alumina discharged from conventional dry scrubbers and stored in the bins of an electrolytic cell's superstructure, which is then dosed into the molten electrolyte, is typically 10° C. to 20° C. below the process gas temperature entering the dry scrubbers.

The next generation of potlines will exceed 460 electrolytic cells thus, extending the length of the pot-rooms to over 1,300 meters. In addition to longer potlines, electrolytic cell amperage has and will continue to exceed well beyond 500 kA. As a consequence, the energy released to the process gases has and will continue to increase the process gas exhaust temperature, thereby potentially reducing the adsorption efficiency of gaseous fluoride on the surface of the alumina and eroding adsorption efficiency of injection type dry scrubbing systems if suitable countermeasures to cool the gases are not included in the GTC design. The injection type dry scrubbing systems used on new electrolytic cell potlines have followed an economies of scale approach resulting in an ever increasing dry scrubber system size and process gas conveyance distance. This approach further increases the capital and operating costs at little to no incremental benefit, which is now at the point of diminishing returns. Constructing large GTC systems (and related ancillaries) in the courtyard between pot-rooms also competes with and interferes with the construction of the smelting process plant housed inside the pot-rooms. The congestion in this area creates inefficiency and raises the probability of an incident putting people, equipment and the execution schedule at ever increasing risk.

Existing emission control systems, configured outside of the electrolytic cell and pot-rooms, often require additional investment to upgrade or replace non-compliant environmental control systems as part of the plan to incrementally increase the operating current of an aluminum smelting process to incrementally increase metal production. The additional investment required for environmental compliance is to the detriment of the upgrade project's economic viability.

Economies of scale combined with relatively low-cost energy, vital to this energy intensive industry, have driven the capacity of the largest aluminum smelter plants to well over one million tons of annual capacity. Compliance with ambient air quality concentration (μg $Fg/m^3$) standards at ground contact for gaseous fluoride and sulphur dioxide emissions becomes a significant challenge for such large process plants. The modern smelters operating with over a million tons of annual aluminum smelting capacity require and use additional emission abatement equipment and systems to comply with the prevailing regulatory requirements, often doubling the investment and operating cost of emission abatement systems and in some cases waste water outfalls to the sea.

In addition, International Publication WO 2008/024931 describes emissions test data for injection type dry scrubbing in a smelting process that confirms a strong correlation between the amount of gaseous fluoride in scrubbed process gas emissions after injection type dry scrubbing and the process gas temperature entering the GTC. This correlation has led to lowering the process gas temperature before the dry scrubbing process by direct or indirect cooling methods in order to reduce the gaseous fluoride in scrubbed process gas emissions after injection type dry scrubbing. As a result, conventional injection type dry scrubbing systems do not address abating the formation of fluoride at the source in an electrolytic cell because the amount of hydrogen entering the electrolytic cell with the fluorinated alumina returned from the injection type dry scrubbing systems, in the form of free moisture, increases as the process gas temperature entering the dry scrubbing process decreases.

The formation and accumulation of hard grey scale in the conventional injection type dry scrubbing system can, if not properly managed, severely diminish emission abatement performance of the GTC, and in some cases cause the shutdown of one or more scrubbing modules or ventilation fans for maintenance. The scale formation rate of alumina is a function of flow turbulence, the presence of fluoride and bath species, the presence of minus 20 micron particles, and the presence of moisture—if any one of these four elements are removed and or diminished, scale formation would respectively be eliminated or dramatically reduced.

Purity of aluminum metal produced by electrolysis in a conventional electrolytic cell is, to a great extent, a function of alumina quality fed to the electrolytic cell. The quality of the fluorinated alumina, in terms of impurities, is a function of the impurities collected from all operating electrolytic cells connected to the GTC gas collection system. Metal purity and its variation from any one electrolytic cell are negatively impacted by the poorest performing electrolytic cells connected to the same GTC.

Electrolytic cell operating efficiency is, among other things, a function of the alumina quality fed to the electrolytic cell. The quality of the fluorinated alumina generated by the conventional injection type dry scrubbing system, in terms of the fines content, temperature and moisture content is a function of the GTC design and its operating parameters. The conventional injection type dry scrubbing system can negatively impact alumina quality in terms of:
  i. Fines content: Increasing the fines content of fresh alumina due to particle attrition created by material handling and injection (including alumina recycle). Increasing the fines content impedes alumina dissolution into the molten cryolyte, increasing the potential for what is known in the industry as "slugging;"
  ii. Temperature: Relatively cool alumina temperature fed to the electrolytic cell, as compared to the molten electrolyte temperature, requires additional energy to heat the feed material;
  iii. Moisture: Free moisture (water) entering the electrolytic cell with the alumina feed material, measured in terms of MOI and to a lesser extent LOI, requires energy to drive off the moisture and leads to what is known in the industry as the "volcano effect" due to the flash vaporization of the moisture when alumina is fed into the cryolyte, which impedes alumina dissolution.

To date, no viable alternatives (to conventional GTC configurations) are known for reducing the life cycle cost for recovering fluorides from the electrolytic cell process gases at the same, or better, adsorption efficiency than is achieved today.

SUMMARY OF THE DISCLOSURE

The present disclosure therefore, meets the above needs and overcomes one or more deficiencies in the prior art by providing systems and methods for reducing the capital and operating costs of a smelting process system and improving the environmental impact of the smelting process using an IGT system to remove and filter undesirable and environmentally hazardous gases and particulates from each electrolytic cell in the smelting process system.

In one embodiment, the present disclosure includes a method for integrated gas treatment in an aluminum smelting process, which comprises: i) delivering non-fluorinated alumina to an electrolytic cell comprising a housing, wherein an upper area of the housing represents a superstructure and at least one of the non-fluorinated alumina and a fluorinated alumina forms a fluidized bed within the superstructure; and ii) removing gaseous fluoride from process gases produced by the electrolytic cell by adsorbing the gaseous fluoride using the non-fluorinated alumina in the fluidized bed, the adsorption of the gaseous fluoride by the non-fluorinated alumina creating the fluorinated alumina and semi-scrubbed process gases.

In another embodiment, the present disclosure includes a system for smelting alumina, which comprises: i) an electrolytic cell comprising a housing wherein an upper area of the housing represents a superstructure; and ii) a porous floor within the superstructure for supporting a fluidized bed comprising at least one of non-fluorinated alumina and fluorinated alumina.

Additional aspects, advantages and embodiments of the disclosure will become apparent to those skilled in the art from the following description of the various embodiments and related drawings.

BRIEF DESCRIPTION OF THE DRAWINGS

The present disclosure is described below with reference to the accompanying drawings in which like elements are referenced with like reference numerals, and in which.

DETAILED DESCRIPTION OF THE PREFERRED EMBODIMENTS

The subject matter of the present disclosure is described with specificity; however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the following description refers to the aluminum smelting industry, the systems and methods of the present disclosure are not limited thereto and may also be applied in other industries and processes to achieve similar results.

Figure 2:
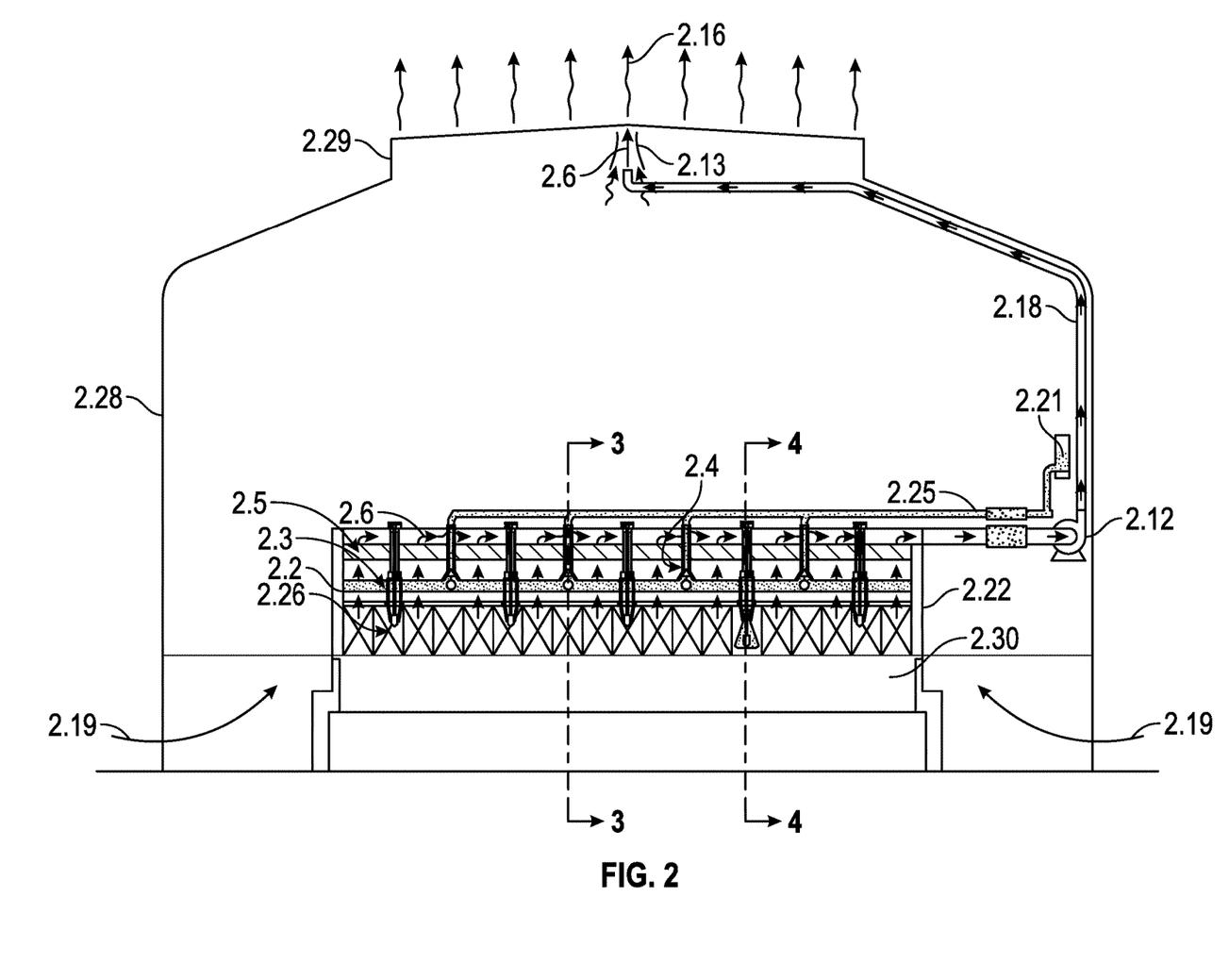
FIG. 2 is a schematic, cross-sectional view of a pot-room and electrolytic cell in a smelting process system illustrating one embodiment of an IGT system according to the present disclosure.
Figure 3:
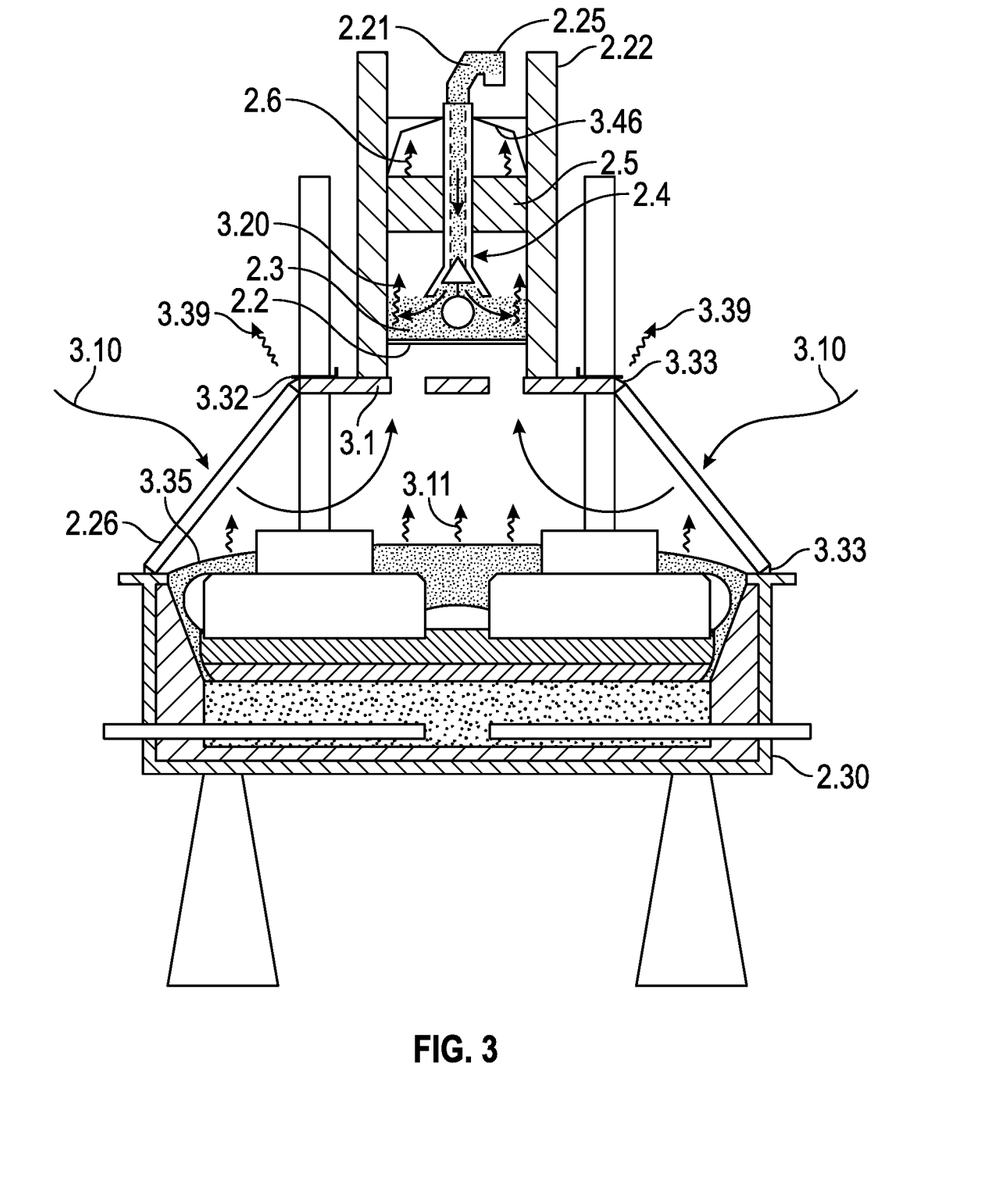
FIG. 3 is a schematic, cross-sectional view illustrating the electrolytic cell in FIG. 2 taken along line 3-3 at the fresh alumina feeder.
Figure 4:
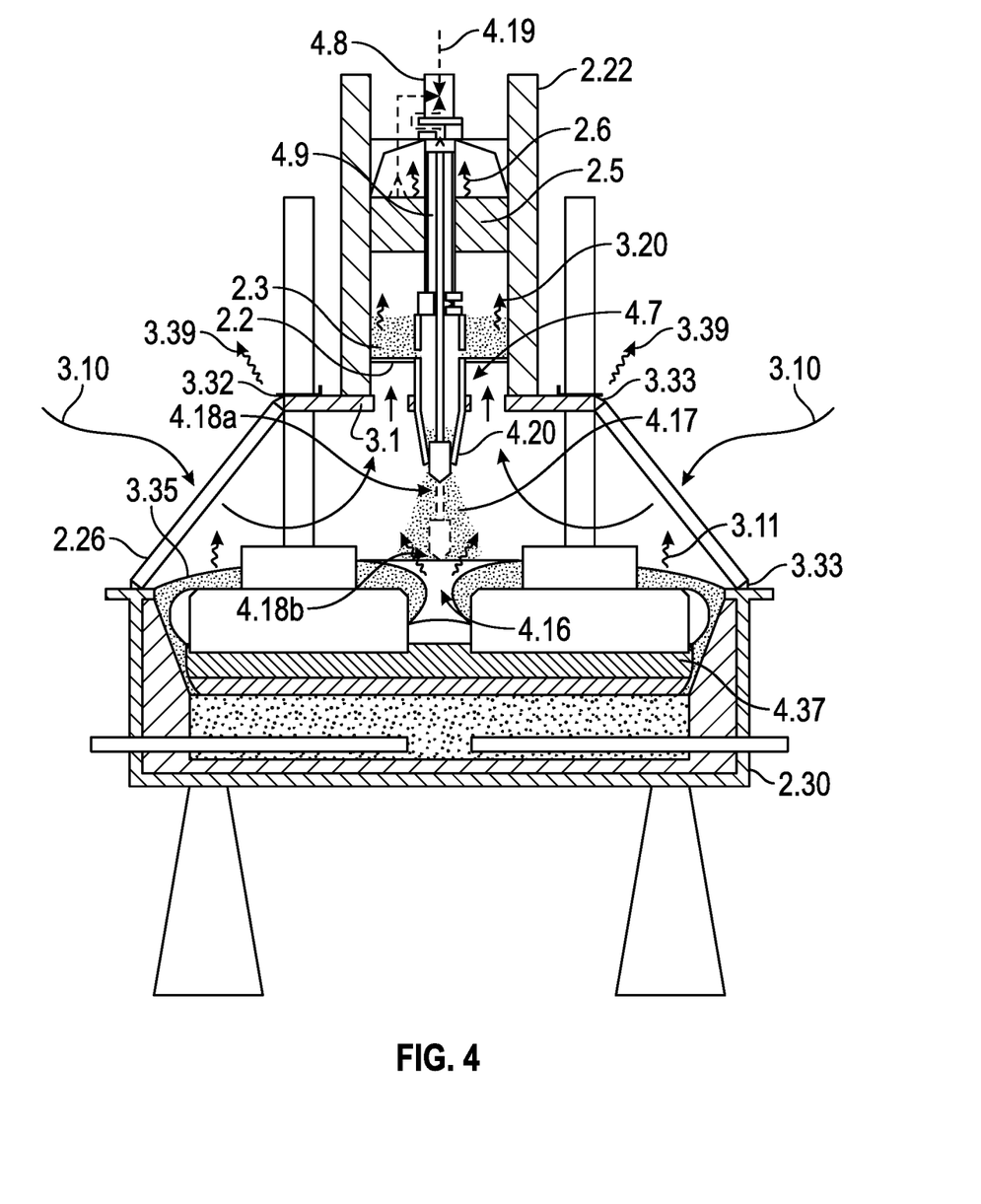
FIG. 4 is a schematic, cross-sectional view illustrating the electrolytic cell in FIG. 2 taken along line 4-4 at the fluorinated alumina breaker-feeder.

The following description refers to FIGS. 2-4, which includes a description of the systems and methods for improving the efficiency and environmental impact of the smelting process using an IGT system to remove and filter undesirable and environmentally hazardous gases and particulates from each electrolytic cell in the smelting process. The systems and methods described herein also use the IGT system to abate the hazardous gases, such as fluoride emissions, from each electrolytic cell, by reducing the source of hydrogen entering the electrolytic cell, and improve the quality of the fluorinated alumina fed to the same electrolytic cell as feed material for smelting aluminum. Contrary to conventional smelting process systems with a centralized GTC using injection type dry scrubbing, the IGT system is configured inside each electrolytic cell and operates at an elevated temperature up to that which the chemical adsorption of gaseous fluoride onto the surface of the alumina is no longer irreversible (approximately 400° C.). The IGT system will thus, reduce the capital and operating costs of a smelting process system and improve the environmental impact of the smelting process. To the extent that temperatures and pressures are used in connection with the following description, those conditions are merely illustrative and are not meant to limit the disclosure.

Referring now to FIG. 2, a schematic, cross-sectional view of a pot-room and electrolytic cell in a smelting process system illustrates one embodiment of an IGT system according to the present disclosure. Fresh alumina 2.21 is delivered directly to the superstructure 2.22 for each electrolytic cell 2.30 by a fresh alumina conveyor 2.25 where it enters a fresh alumina feeder assembly 2.4, which is further described in reference to FIG. 3. The conventional fluorinated alumina superstructure bins are replaced by a fluidized bed 2.3, initially comprising fresh alumina 2.21, and a filter system 2.5 for removing gaseous and particulate fluoride from process gases. The fluidized bed 2.3 is supported by a porous floor 2.2 that permits the gaseous and particulate fluoride from process gases to pass through it while supporting the fresh alumina 2.21. A dedicated variable speed exhaust fan 2.12 creates sufficient under-pressure within a hooding system of the superstructure 2.22 for each electrolytic cell 2.30, consisting primarily of removable side covers 2.26, to entrain the scrubbed process gases 2.6 and ambient air drawn into the electrolytic cell 2.30 during both the closed and open electrolytic cell operating conditions. The scrubbed process gases 2.6 discharged from the exhaust fan 2.12 are conveyed by a dedicated scrubbed process gas duct 2.18 to an area under the pot-room roof gravity ventilator 2.29. The relatively hot scrubbed process gases 2.6 then enter an inductor 2.13 and are thus, vented through the pot-room roof gravity ventilator 2.29 to an open environment outside the electrolytic cell 2.30 and pot-room 2.28 at a temperature greater than 125° C. and up to about 400° C. The inductor 2.13 induces additional ventilation flow through the pot-room roof gravity ventilator 2.29 and increases the ambient air 2.19 drawn into the pot-room 2.28 through various designed openings. The emission plume 2.16 leaving the pot-room 2.28 includes the scrubbed process gases 2.6, ambient air 2.19 and fugitive (untreated) emissions escaping the electrolytic cell 2.30 through various gaps therein. The IGT system thus, eliminates the need for the centralized GTC 1.30 illustrated in FIG. 1 and fluorinated alumina superstructure bins 1.21 in each electrolytic cell 1.31.

Referring now to FIG. 3, a schematic, cross-sectional view illustrates the electrolytic cell in FIG. 2 taken along line 3-3 at the fresh alumina feeder. The level of the fresh alumina 2.21 initially deposited in the fluidized bed 2.3 is maintained by a fresh alumina feeder assembly 2.4, which releases the fresh alumina 2.21 from the fresh alumina conveyor 2.25 into the fluidized bed 2.3. The hooding system efficiency of the electrolytic cell 2.30 is improved by reducing the open area (gaps) in the electrolytic cell 2.30 through which process gases 3.11 are prone to escape as fugitive emissions 3.39. This is accomplished by an improved design of the anode stem seals 3.32, the removable side cover seals 3.33 and the removable side covers 2.26. In this manner, the collection of process gases 3.11 produced by the smelting process in the electrolytic cell 2.30 and released through openings in the crust 3.35 is improved and the flow of ambient air 3.10 drawn into the electrolytic cell 2.30 through various gaps therein is significantly reduced. As a result, the temperature of the process gases 3.11 in the electrolytic cell 2.30 increases causing the amount of gaseous fluoride in the process gases 3.11 to decrease. The fluidized bed 2.3 and filter system 2.5 are positioned in the superstructure 2.22 for each electrolytic cell 2.30 and replace the conventional fluorinated alumina superstructure bins 1.21 in FIG. 1.

In typical closed and open electrolytic cell operating conditions, the mixture of process gases 3.11 and ambient air 3.10 drawn into the electrolytic cell 2.30 rise up through slots in a gas skirt 3.1 at the bottom of the superstructure 2.22 and through openings in the porous floor 2.2 supporting the fluidized bed 2.3. As the process gases 3.11 are drawn through the fluidized bed 2.3, the fresh alumina 2.21 is fluidized and gaseous hydrogen fluoride in the process gases 3.11 is first adsorbed and then chemisorbed onto the surface of the fresh alumina 2.21 at elevated temperatures greater than 125° C. and up to that at which the chemical reaction is no longer irreversible (i.e. approximately 400° C.). Fluorinated alumina and particulate fluoride entrained in the semi-scrubbed process gases 3.20 exiting the fluidized bed 2.3 are then filtered by the filter system 2.5 before releasing the scrubbed process gases 2.6 through a scrubbed process gas plenum 3.46 that is connected to the variable speed exhaust fan 2.12 in FIG. 2. The IGT system thus, removes and filters undesirable and environmentally hazardous gases and particulates from each electrolytic cell 2.30 in the smelting process by adsorbing gaseous fluoride from the process gases 3.11 at an elevated temperature inside each electrolytic cell 2.30. This is achieved by significantly reducing the mass flow of ambient air 3.10 drawn into each electrolytic cell 2.30 and by configuring the IGT system within the existing superstructure 2.22 of each electrolytic cell 2.30. The resulting process gas temperature for the reduced flow is increased up to about 400° C. As a result, the amount of gaseous fluoride in the process gases 3.11 decreases because the source of moisture (hydrogen) entering the electrolytic cell 2.30 forming gaseous fluoride through thermal hydrolysis is reduced as the temperature increases in the electrolytic cell 2.30.

Referring now to FIG. 4, a schematic, cross-sectional view illustrates the electrolytic cell in FIG. 2 taken along line 4-4 at the fluorinated alumina breaker-feeder. The fluorinated alumina 4.17 in the fluidized bed 2.3 enters the electrolytic cell 2.30 as a premeasured charge through an opening at the bottom 4.20 of the fluorinated alumina breaker-feeder assembly 4.7 when it is at an open position 4.18b shown in dashed lines. The fluorinated alumina 4.17 thus, falls by gravity into a feeder hole 4.16 in the crust 3.35 created by the fluorinated alumina breaker-feeder assembly 4.7. Unlike conventional smelting processes using a centralized GTC, the fluorinated alumina 4.17 is not recycled back into the scrubbing process. Compressed air 4.9 from a compressed air supply 4.19, which is periodically exhausted from an actuator control valve 4.8, is directed to the filter system 2.5 for cleaning the filter system 2.5.

The fresh alumina initially contained in the fluidized bed 2.3 by the fluorinated alumina breaker-feeder assembly 4.7 in a closed position 4.18a has an average residence time of between 12 hours and 15 hours (dependent on electrolytic cell technology) to react with the process gases 3.11 before the fluorinated alumina 4.17 is released as a premeasured charge through an opening at the bottom 4.20 of the fluorinated alumina breaker-feeder assembly 4.7. The extended residence time and reduced intra-particle diffusion resistance of the fluorinated alumina 4.17 in the fluidized bed 2.3, as compared to conventional smelting processes with a centralized GTC, can significantly enhance the adsorption kinetics of gaseous fluoride onto the surface of fresh alumina. The extended residence time and contact quality of the fresh alumina with the process gases 3.11 in the fluidized bed 2.3 preheats the alumina to a temperature approaching the temperature of the scrubbed process gases 2.6. As a result, the loosely bound moisture on the surface of the alumina is desorbed and residual hydroxyls (OH) in the under calcined gibbsite react to form $H_2O$ vapor before the fluorinated alumina 4.17 is released into the molten electrolyte 4.37 causing a reduction in the source of moisture (hydrogen) available in the electrolytic cell 2.30 that is responsible for producing gaseous fluoride in the process gases 3.11.

The IGT system illustrated in FIGS. 2-4 should thus, improve the efficiency and environmental impact of the smelting process by: i) reducing the source of moisture (hydrogen) entering the electrolytic cell forming gaseous fluoride through thermal hydrolysis; ii) desorbing loosely bound moisture and residual hydroxyls (OH) before the fluorinated alumina is fed into the molten electrolyte reducing the source of moisture (hydrogen) available in the electrolytic cell forming gaseous fluoride by thermal and electrochemical hydrolysis; iii) reducing capital investment and operating costs by reducing and/or eliminating injection type dry scrubbing equipment and related ancillary equipment requirements due to the combined effect of a lower mass flow from each electrolytic cell and configuration of the scrubbing equipment in the electrolytic cell superstructure; iv) reducing fugitive gas emission release to the environment due to the combined effect of improved hooding efficiency and a lower gaseous fluoride formation rate in the electrolytic cell; v) reducing the formation rate for hard grey scale due to reduced moisture in the electrolytic cell; vi) improving metal purity due to the isolation of impurities migrating between electrolytic cells; vi) reducing exposure of personnel to electrolytic cell emissions and heat due to the combined effect of improved hooding efficiency, lower gaseous fluoride formation rate in each electrolytic cell, and by increasing pot-room ventilation; vii) eliminating plant compressed air consumption for filter cleaning by using the exhaust air from the fluorinated alumina breaker-feeder assembly; viii) increasing electrolytic cell efficiency due to the improved fluorinated alumina quality in terms of the fines content (lower), temperature (higher) and moisture content (lower); ix) improving scrubbed process gas thermal properties due to higher process gas temperatures improving waste heat capture and recovery opportunities; x) significantly increasing reaction time and lowering intra-particle diffusion resistance reducing emission sensitivity to varying alumina supply quality; xi) increasing pot-room roof plume buoyancy improving dispersion of residual pollutants resulting in lower ground concentrations at point of impingement possibly avoiding investment in additional emission abatement equipment and systems to comply with the prevailing regulatory requirements; xii) significantly reducing courtyard congestion during plant construction due to the elimination of courtyard GTCs and related systems reducing the construction risk; and xiii) providing an economically viable method for upgrade or replacement of non-compliant environmental control systems as part of a plan to incrementally increase the operating current of an aluminum smelting process to incrementally increase metal production.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for integrated gas treatment in an aluminum smelting process, which comprises:
   delivering non-fluorinated alumina to an electrolytic cell comprising a housing, wherein an upper area of the housing represents a superstructure and at least one of the non-fluorinated alumina and a fluorinated alumina forms a fluidized bed within the superstructure; and
   removing gaseous fluoride from process gases produced by the electrolytic cell by adsorbing the gaseous fluoride using the non-fluorinated alumina in the fluidized bed, the adsorption of the gaseous fluoride by the non-fluorinated alumina creating the fluorinated alumina and semi-scrubbed process gases.

2. The method of claim 1, wherein the gaseous fluoride is adsorbed by the non-fluorinated alumina at a temperature greater than 125° C.

3. The method of claim 2, wherein the gaseous fluoride is adsorbed by the non-fluorinated alumina at a temperature of up to about 400° C.

4. The method of claim 1, wherein the gaseous fluoride is adsorbed by the non-fluorinated alumina for at least three (3) hours.

5. The method of claim 4, wherein the gaseous fluoride is adsorbed by the non-fluorinated alumina for up to about fifteen (15) hours.

6. The method of claim 1, further comprising filtering fluoride particulates entrained in the semi-scrubbed process gases, the filtering occurring within the superstructure above the fluidized bed and producing scrubbed process gases.

7. The method of claim 6, wherein the scrubbed process gases are vented to the open environment at a temperature greater than 125° C. in an emission plume.

8. The method of claim 7, wherein the scrubbed process gases are vented to the open environment at a temperature of up to about 400° C. in an emission plume.

9. The method of claim 1, wherein the gaseous fluoride is adsorbed by using only the non-fluorinated alumina delivered to the electrolytic cell.

10. The method of claim 1, wherein the fluorinated alumina is created only in the electrolytic cell.

11. The method of claim 10, further comprising producing alumina metal in the electrolytic cell using the fluorinated alumina from only the electrolytic cell.

12. The method of claim 7, further comprising venting fugitive emissions from a potroom surrounding the electrolytic cell to an open environment outside the electrolytic cell in the emission plume.

13. The method of claim 12, wherein the fugitive emissions are vented through a top opening in the potroom using an inductor to induce venting of the fugitive emissions and ambient air through the top opening.

14. A system for smelting alumina, which comprises:
an electrolytic cell comprising a housing wherein an upper area of the housing represents a superstructure; and
a porous floor within the superstructure for supporting a fluidized bed comprising at least one of non-fluorinated alumina and fluorinated alumina.

15. The system of claim 14, further comprising a gas skirt positioned within the electrolytic cell below the porous floor, the gas skirt comprising a plurality of openings.

16. The system of claim 14, further comprising a filter system positioned within the superstructure above the porous floor.

17. The system of claim 14, wherein the electrolytic cell comprises a pair of seals positioned around each anode stem where each anode passes through the housing of the electrolytic cell.

18. The system of claim 14, wherein the electrolytic cell comprises a plurality of side cover seals positioned at a connection of each removable side cover to the housing of the electrolytic cell.

19. The system of claim 17, further comprising a ventilation system operatively connecting an opening in the superstructure to an open environment outside the electrolytic cell, wherein the ventilation system includes an inductor positioned above a scrubbed process gas duct.

* * * * *